H. GOLDSCHMIDT.

PROCESS OF WELDING METALS.

APPLICATION FILED MAY 7, 1906.

Reissued May 4, 1909.

12,953.

Witnesses
Chas. F. Clagett
Mary E. Stanton

Inventor
Hans Goldschmidt
By his Attorney
Chas. F. Dana

UNITED STATES PATENT OFFICE.

HANS GOLDSCHMIDT, OF ESSEN-ON-THE RUHR, GERMANY, ASSIGNOR, BY MESNE ASSIGNMENTS, TO GOLDSCHMIDT THERMIT COMPANY, OF NEW YORK, N. Y., A CORPORATION OF NEW YORK.

PROCESS OF WELDING METALS.

No. 12,953. Specification of Reissued Letters Patent. Reissued May 4, 1909.

Original No. 735,244, dated August 4, 1903, Serial No. 724,708. Application for reissue filed May 7, 1906. Serial No. 315,688.

*To all whom it may concern:*

Be it known that I, HANS GOLDSCHMIDT, a subject of the King of Prussia, German Emperor, and a resident of Essen-on-the-Ruhr, in the Province of the Rhine, German Empire, have invented a new and useful Process of Welding Metals, of which the following is an exact specification.

My invention relates to a process of metal welding by casting molten material, preferably molten metal resulting from the reaction due to igniting a mixture of a metallic compound and aluminium, into union with a metallic part. Its chief use is in welding metal pieces by casting molten metal around the ends to be welded.

In the processes hitherto used it was always a great disadvantage, for some kinds of work, that the metal cast around the ends to be welded joined with, that is, fused, the metal pieces. This disadvantage for such kinds of work is done away with by the present invention, which consists in first coating the parts to be joined with molten alumina or the like slag. By this coating the molten metal is prevented from coming in contact with and adhering to the parts to be welded.

In order to carry the process into effect, a sand, clay, or the like mold is provided around the parts to be joined, whereafter at first molten slag is cast upon the parts to be joined, which slag congeals around these parts and the heat contained in the molten slag is transferred to these metal pieces. After a coating of slag is formed around the metal pieces the molten metal is cast into the mold, which metal, on account of its being an excellent heat-conductor, transfers its entire heat to the pieces to be welded, so that in case the joining faces are pressed together with a sufficient pressure a welding of the same takes place.

Figure 1:
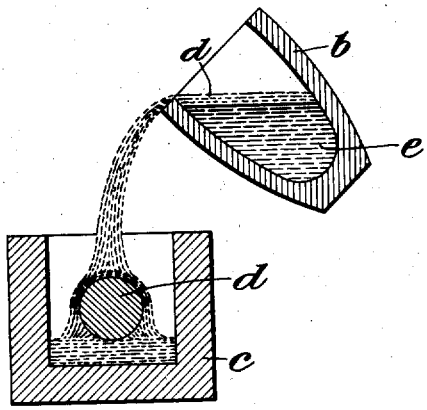
Figure 2:
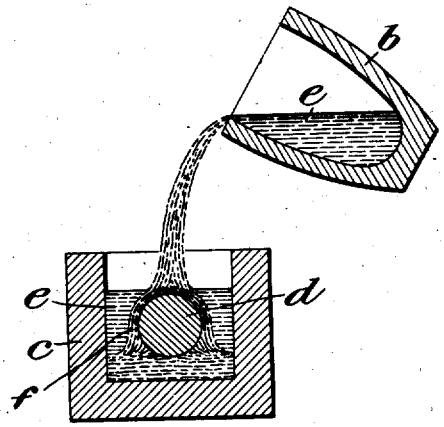
Figure 3:
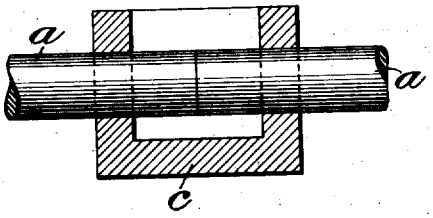

In the accompanying drawings forming part of this specification, Figure 1 is a vertical section of the mold and the crucible during the coating of the metal pieces with slag. Fig. 2 is a vertical section of the mold and the crucible during the casting of the metal. Fig. 3 is a longitudinal section of the mold with the metal pieces to be welded situated within the same.

In order to carry my process into effect, a crucible is filled with a mixture of iron oxid and aluminium metal, both in pulverized form. Afterward this mixture is ignited, so that a chemical reaction takes place, the resulting product of which reaction consists in molten iron and alumina.

In the drawings, *a* represents the iron pieces to be welded.

*b* is a crucible.

*c* is a mold in which the metal pieces are situated.

As the specific weight of the alumina is less than the specific weight of the molten iron, the alumina *d* will always float above and form a layer over the metal *e*. After the reaction is finished the contents of the crucible *b* is cast upon the pieces *a* to be welded. The alumina *d*, floating above, will at first come in contact with these pieces and form a protective cover *f* around the same, so that the molten iron *e* cannot come directly in contact with the same and cannot join with these pieces. The latter mode of carrying the process into effect is especially advantageous, as the resulting products of the reaction are in a highly overheated state, so that the welding of the pieces takes place in a very short time.

It will be understood that before casting the molten slag and the molten metal around the pieces to be welded these pieces must be pressed together by means of suitable devices or the pieces are held firmly in their position by means of clamps or the like, in which case the pressing together is effected by the molecular expansion of the pieces caused by the heating of the same.

Having thus fully described the nature of my said invention, what I desire to secure by Letters Patent of the United States is—

1. A process for welding metals, consisting in casting molten slag around the meeting faces of the pieces to be welded together, and after the molten slag has formed a protecting coating around the same, casting molten metal around the protecting-cover, as and for the purpose set forth.

2. A process for welding metal pieces, consisting in filling a crucible with a mixture of iron oxid and aluminium, igniting the mixture and casting the resulting products of the reaction taking place around the part to be welded, substantially as set forth.

3. A process of welding metals, which consists in igniting a mixture of metallic compound and aluminium out of contact with the parts to be welded, and casting molten material resulting from the reaction into union with the surfaces of two metallic parts to be joined.

In witness whereof I have hereunto set my hand in presence of two witnesses.

HANS GOLDSCHMIDT

Witnesses:

WOLDEMAR HAUPT,
HENRY HASPER.